United States Patent
Suzuki et al.

(10) Patent No.: US 11,783,311 B2
(45) Date of Patent: *Oct. 10, 2023

(54) COMMODITY REGISTRATION DEVICE WITH WIRELESS TAG READER AND OPTICAL READING UNIT

(71) Applicant: TOSHIBA TEC KABUSHIKI KAISHA, Tokyo (JP)

(72) Inventors: Yuki Suzuki, Izunokuni Shizuoka (JP); Shigeaki Suzuki, Gotemba Shizuoka (JP); Wataru Sakurai, Izu Shizuoka (JP); Takuya Takasu, Shizuoka Shizuoka (JP); Kenta Takeda, Tagata Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/711,442

(22) Filed: Apr. 1, 2022

(65) Prior Publication Data
US 2022/0222646 A1 Jul. 14, 2022

Related U.S. Application Data

(63) Continuation of application No. 17/149,298, filed on Jan. 14, 2021, now Pat. No. 11,321,696.

(30) Foreign Application Priority Data
Mar. 18, 2020 (JP) .................................. 2020-047276

(51) Int. Cl.
*G06Q 20/20* (2012.01)
*G06K 7/10* (2006.01)
(Continued)

(52) U.S. Cl.
CPC ....... *G06Q 20/208* (2013.01); *G06K 7/10425* (2013.01); *G06K 7/1413* (2013.01); *G06Q 20/209* (2013.01); *G07G 1/0045* (2013.01)

(58) Field of Classification Search
CPC .. G06Q 20/204; G06Q 20/208; G06G 1/0045; G06G 1/0081; G06G 1/009;
(Continued)

(56) References Cited

U.S. PATENT DOCUMENTS 11,321,696 B2 * 5/2022 Suzuki ................ G07G 1/0045
2006/0261161 A1 11/2006 Murofushi et al.
(Continued)

FOREIGN PATENT DOCUMENTS

CN 204044845 U 12/2014
CN 110379094 A 10/2019

*Primary Examiner* — Suezu Ellis
(74) *Attorney, Agent, or Firm* — Kim & Stewart LLP (57) ABSTRACT

According to one embodiment, a commodity registration device includes an optical reading unit with a reading range. The optical reading unit is configured to acquire an image of a commodity in the reading range. A wireless tag reading unit is configured to read a commodity code from a wireless tag of the commodity in the reading range. A processor determines whether the commodity is in the reading range of the optical reading unit and causes a notification unit to indicate the commodity has been registered if the wireless tag reading unit successfully reads the commodity code from the wireless tag while the commodity is determined to be in the reading range of the optical reading unit.

19 Claims, 4 Drawing Sheets

(51) Int. Cl.
*G06K 7/14* (2006.01)
*G07G 1/00* (2006.01)

(58) Field of Classification Search
CPC .. G06K 7/1096; G07G 1/0045; G07G 1/0081; G07G 1/009
USPC .......................................................... 235/383
See application file for complete search history.

(56) References Cited

U.S. PATENT DOCUMENTS

| | | |
|---|---|---|
| 2007/0040024 A1 | 2/2007 | Murofushi et al. |
| 2007/0138271 A1 | 6/2007 | Murofushi et al. |
| 2009/0026262 A1 | 1/2009 | Suzuki |
| 2011/0198400 A1 | 8/2011 | Sano |
| 2013/0232037 A1 | 9/2013 | Edwards et al. |
| 2014/0140574 A1* | 5/2014 | Takeno ................. G06V 20/20 382/103 |
| 2017/0330426 A1 | 11/2017 | Jaffri et al. |
| 2019/0026713 A1 | 1/2019 | Hagiwara |
| 2019/0188673 A1 | 6/2019 | Suzuki |
| 2019/0318336 A1 | 10/2019 | Mihara |
| 2021/0295299 A1 | 9/2021 | Suzuki |

* cited by examiner

COMMODITY REGISTRATION DEVICE WITH WIRELESS TAG READER AND OPTICAL READING UNIT

CROSS-REFERENCE TO RELATED APPLICATIONS

This application is a continuation of U.S. patent application Ser. No. 17/149,298, filed on Jan. 14, 2021, which is based upon and claims the benefit of priority from Japanese Patent Application No. 2020-047276, filed on Mar. 18, 2020, the entire contents of each of which are incorporated herein by reference.

FIELD

Embodiments described herein relate generally to a commodity registration device and a control program for a commodity registration device.

BACKGROUND

A commodity registration device including both an optical reading unit for reading a printed code symbol, such as a barcode or a two-dimensional code, on an item and a wireless tag reading unit for reading information from a wireless tag, such as a radio frequency identification (RFID) tag, is known.

In such the commodity registration device, when a code symbol or a wireless tag attached to an item is successfully read, typically a notification sound is emitted to report the successful reading of the code symbol or the wireless tag. However, the timing for the notification sound emission may differ between a case where a code symbol has been read and a case where a wireless tag has been read because the reading area or range can be different for the optical reading unit and the wireless tag reading unit.

For example, before a user even brings a commodity close to a reading window of the optical reading unit, the wireless tag reading unit may have already successfully read the wireless tag attached to the commodity, and thus the notification sound may be generated while the user is still attempting to position the commodity before the reading window. As a consequence, the user may be confused by a difference in sound emission timing between the case where the code symbol attached to the commodity is successfully read by holding the commodity in front of the reading window of the optical reading unit and the case where the wireless tag is read by the wireless tag reading unit.

DETAILED DESCRIPTION

In general, according to one embodiment a commodity registration device includes an optical reading unit and a wireless tag reading unit. The optical reading unit has a reading range and is configured to acquire an image of a commodity in the reading range. The wireless tag reading unit is configured to read a commodity code from a wireless tag of the commodity in the reading range of the optical reading unit. A processor is configured to determine whether the commodity is in the reading range of the optical reading unit and cause a notification unit to indicate the commodity has been registered if the wireless tag reading unit successfully reads the commodity code from the wireless tag while the commodity is determined to be in the reading range of the optical reading unit.

Hereinafter, certain embodiments of a commodity registration device and a program executed by a commodity registration device will be described with reference to the drawings. In the present disclosure a point of sale (POS) terminal will be described as one example of a commodity registration device. The present disclosure is not limited to the particular example embodiments.

(Configuration of a POS Terminal According to an Embodiment)

Figure 1:
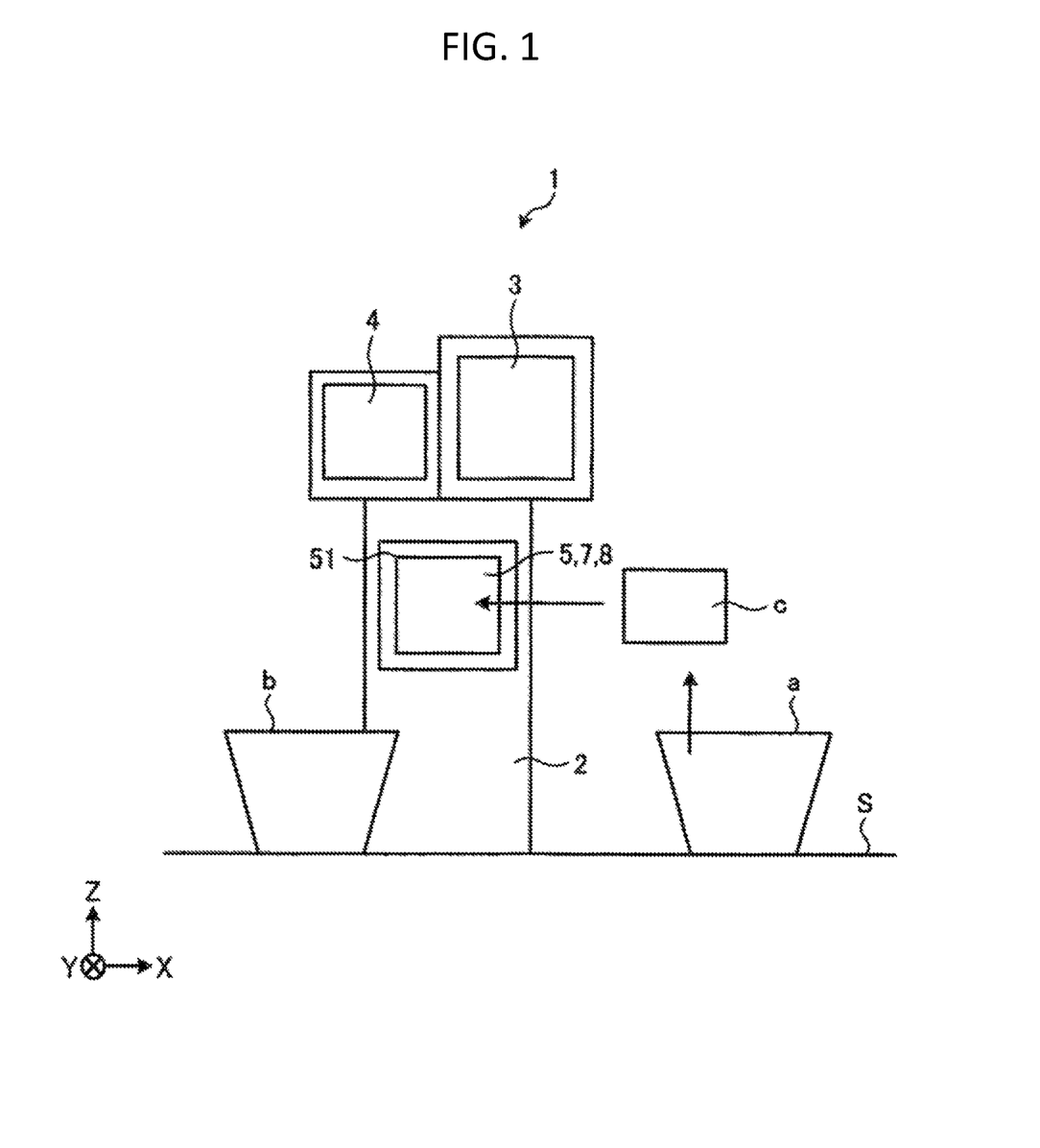
FIG. 1 depicts a configuration of a POS terminal according to an embodiment.

FIG. 1 illustrates an example configuration of a POS terminal 1 according to an embodiment. POS terminal 1 includes a main body 2, a monitor 3, an operation panel 4, a scanner 5, an RFID reader 7, an antenna 8, and the like.

The main body 2 is formed in a substantially rectangular parallelepiped (a box-like) shape, and is mounted, standing, or placed on a sacker table S. The height of the main body 2 above the sacker table S is preferably about eye-level for a user of the sacker table S. In this context, the sacker table S is a table or counter-like structure on which a shopping basket or the like containing commodities being purchased can be placed during the registration and bagging process(es).

The main body 2 has a reading window 51. The reading window 51 serves as an opening in the main body 2 through which light and/or radio waves may pass. A scanner 5, an RFID reader 7, and an antenna 8 are installed proximate to the reading window 51. The user holds a commodity C in front of the reading window 51 to read (image) the commodity. Furthermore, the main body 2 includes a speaker 6 (see FIG. 2) for emitting a notification sound or the like.

The monitor 3 is one example of a display unit. The monitor 3 is provided above the reading window 51. The monitor 3 can be a display unit with an integrated touch panel such as an LCD (liquid crystal display) device or the like. During sales registration processing at the POS terminal 1, the monitor 3 displays information such as a commodity name, a price, and the like of a commodity being registered for purchase by a user.

In this example, the operation panel 4 is provided adjacent to a side portion of the monitor 3. The operation panel 4 includes buttons and/or keys for performing various operations. Although FIG. 1 shows an example in which the monitor 3 and the operation panel 4 appear separately provided, the monitor 3 and the operation panel 4 may instead be integrally provided with each other.

The scanner 5 reads a code symbol attached to a commodity. In the present embodiment, the scanner 5 includes an imaging element, such as a CCD (Charge Coupled Device) or a CMOS (Complementary MOS), and an imaging lens. The imaging lens forms an image of an imaging area on the imaging element. Here, an imaging area refers to the area/region from which an image of a commodity (more particularly, in this example, the code symbol on the commodity) can be acquired by the imaging element through the reading window 51 and the imaging lens.

The scanner 5 images items outside the main body 2 via the reading window 51. For example, the scanner 5 captures an optical image of a barcode, a two-dimensional code, or the like printed on a package or the like of a commodity C. The scanner 5 is an example of an optical reading unit, and the barcode, the two-dimensional code are examples of a code symbol that can be read by the scanner 5.

Here, it is assumed that a barcode, a two-dimensional code, or the like is printed on the packaging of the commodity C and encodes data such as a product identifier (commodity code), and a price of the commodity may be determined from the encoded data.

According to the present embodiment, the POS terminal 1 can detect that the commodity C is in the commodity reading area of the scanner 5 (scanner reading area) based on an image captured by the scanner 5. A commodity detection unit 123 can be provided to determine from the image whether the commodity C is in the scanner reading area.

In this context, the scanner reading area refers to the area or region within which an optical reading unit, such as scanner 5, can read a code symbol that is attached to the commodity. In the present embodiment, the scanner reading area is an area or region in which the scanner 5 can read a barcode, a two-dimensional code, or the like.

The RFID reader 7 reads a wireless tag attached to a commodity.

In the present embodiment, the RFID reader 7 reads information stored in an RFID tag by causing the antenna 8 to radiate radio waves. The RFID reader 7 is an example of a wireless tag reading unit, and an RFID tag is an example of a wireless tag, which may also be called a radio tag.

The antenna 8 is disposed proximate to the reading window 51 and radiates radio waves. In the present embodiment, the antenna 8 radiates radio waves outward from the front of the POS terminal 1 (that is, in the negative y-axis direction in FIG. 1). There is thus a radio wave communication range in front of the POS terminal 1 within which communication with an RFID tag is possible and beyond which communication with the is not possible or at least unreliable.

The reading window 51 is a material that allows radio waves to pass through it. The rear (positive Y-axis direction) facing surface of the main body 2, which is the surface on the side of the main body 2 opposite from the side of the main body 2 in which the reading window 51 is provided, is a material that blocks (or reflects) radio waves. Accordingly, since only an RFID tag attached to the commodity in front of the POS terminal 1 can be read by the RFID reader 7, it is possible to prevent an RFID tag attached to a commodity on the rear surface side of the main body 2 from being erroneously read by the RFID reader 7.

In the present embodiment, the RFID reader 7 and the antenna 8 are installed proximate to the reading window 51, but the installation location of the RFID reader 7 and the antenna 8 is not limited thereto. For example, the RFID reader 7 and the antenna 8 may be installed below the sacker table S.

In the present embodiment, the user can read a barcode, a two-dimensional code, or the like attached to a commodity by holding the commodity over the reading window 51. Therefore, it can be said that the reading window 51 exists in a region where the scanner 5 can read a barcode, a two-dimensional code, or the like. Proximate to the reading window 51, the scanner 5 and also the RFID reader 7 and the antenna 8 are provided.

That is, in the present embodiment, the reading area (tag communication range) of RFID reader 7 and the antenna 8 overlap the reading area (scanner reading area) of the scanner 5.

Next, an operation of a user such as a customer or an operator who uses the POS terminal 1 will be described. In the following description, it is assumed that either that both a code symbol (a bar code, a two-dimensional code, or the like) and an RFID tag are attached to each commodity C or that only an RFID tag is attached to each commodity C. First, the user takes the commodity C from a shopping basket a. In this context, shopping basket a is the location in which each commodity C is placed before the commodity registration process begins. After a commodity C is removed from shopping basket a, the user next passes the commodity C in front of the reading window 51.

When the POS terminal 1 reads only the barcode, the two-dimensional code, or the like out of the barcode, the two-dimensional code, or the like, and the RFID tag attached to the commodity C, the POS terminal 1 generates a notification sound indicating that the barcode, the two-dimensional code, or the like has been read to be emitted from the speaker 6, and performs a commodity registration process. After confirming the sound, the user puts the commodity C into a shopping basket b into which the commodity C after the commodity registration process is put.

When the POS terminal 1 reads an RFID tag and also detects that the commodity C is in the scanner reading area from the image captured by the scanner 5, the POS terminal 1 emits a notification sound from the speaker 6 indicating that the RFID tag has been successfully read and then performs a commodity registration process. When the code symbol and the RFID tag are both read, the reading result from the RFID tag is prioritized. After confirming the successful registration sound, the user then puts the commodity C into the shopping basket b. In this example, the shopping basket b is the place in which the commodity C is put after the commodity registration process on the commodity C is successfully completed.

When the POS terminal 1 fails in the commodity registration attempt, the POS terminal 1 emits a sound from the speaker for notifying an error. In this case, the user is expected not to move the commodity C into the shopping basket b and attempt to perform the commodity registration process again while taking measures to make the subsequent registration attempt successful.

Although an example of a configuration of the POS terminal 1 has been described above, the configuration of the POS terminal 1 is not limited thereto. For example, in addition to the above-described configuration, a hand scanner (hand-held type scanner) or the like for reading code symbol attached to a large commodity that might be difficult to hold in front of the reading window 51 may be provided.

(Hardware Configuration of POS Terminal)

Figure 2:
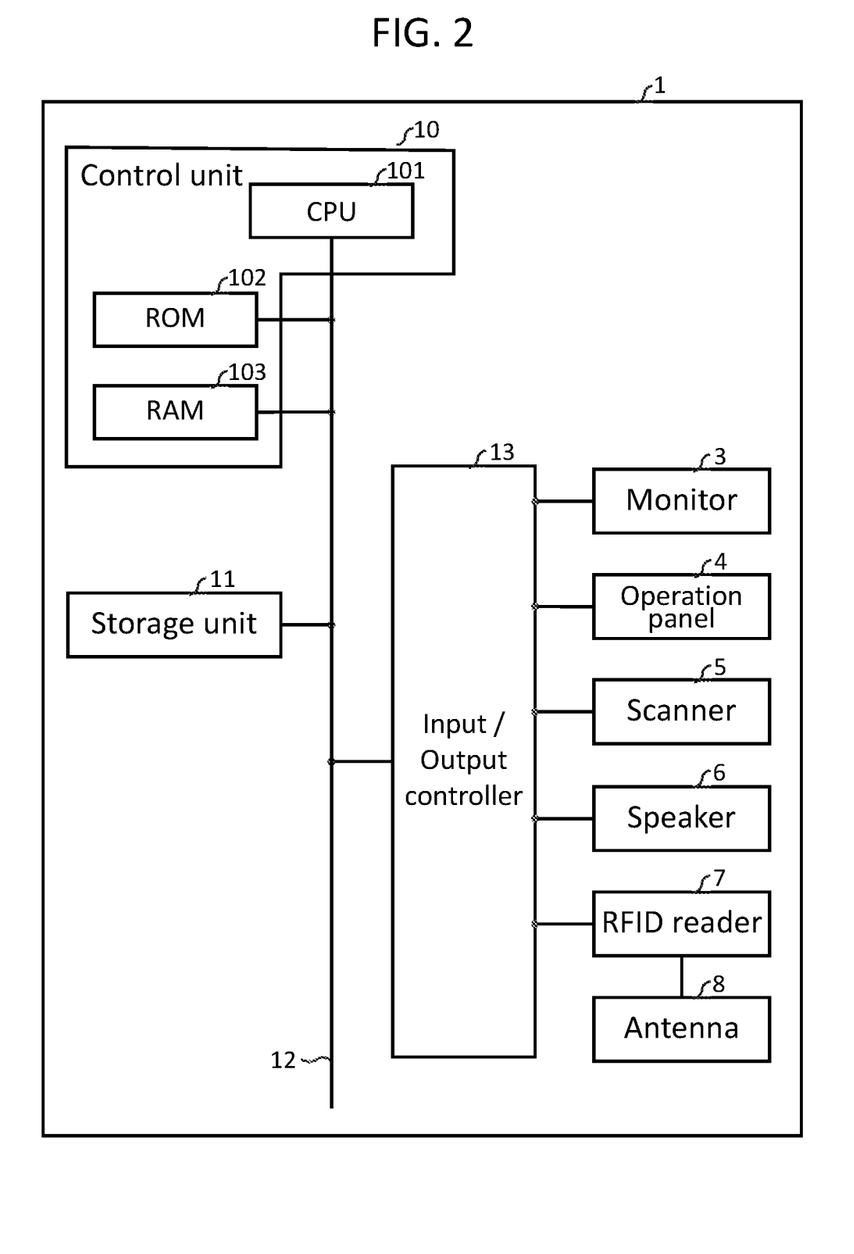
FIG. 2 is a block diagram depicting aspects of a hardware configuration of a POS terminal according to an embodiment.

Next, a hardware configuration of the POS terminal 1 will be described. FIG. 2 is a diagram illustrating an example of a hardware configuration of the POS terminal 1 according to the embodiment.

The POS terminal 1 includes a control unit 10 (also referred to as a controller), a storage unit 11, and an input/output controller 13.

The control unit 10 includes a CPU (Central Processing Unit) 101, a ROM (Read Only Memory) 102, and a RAM (Random Access Memory) 103. The CPU 101 is connected to the ROM 102 and the RAM 103 via a bus line 12 or the like.

In the control unit 10, various programs that may be stored in the ROM 102 or the storage unit 11, are loaded into RAM 103 and executed by CPU 101. Thus, in general, CPU 101 controls functions of the POS terminal 1 by operating in accordance with the various programs loaded in the RAM 103. That is, the control unit 10 in this example has a configuration corresponding to that of a general computer executing particular software providing various operating functions of POS terminal 1.

The control unit 10 is connected to the storage unit 11 and the input/output controller 13 via a bus line 12.

The storage unit 11 is, in this example, a non-volatile memory, such as a flash memory, an HDD (Hard Disk Drive), or the like that retains stored information even when the power is turned off. The storage unit 11 stores a control program. In this context, a control program is a program for providing the described functions of the POS terminal 1 according to the present embodiment. In this example, the storage unit 11 stores a commodity master 111, a notification sound file 112, and the like.

The input/output controller 13 is connected to components such as the monitor 3, the operation panel 4, the scanner 5, the speaker 6, the RFID reader 7, and the antenna 8. The input/output controller 13 operates to control various types of connected hardware based on commands generated by the control unit 10.

In this example, the monitor 3 displays various information related to operations of the POS terminal 1 and commodity information related to products being registered by the POS terminal 1.

The operation panel 4 detects user input operations, such as the selection (touching or otherwise) of various buttons of the operation panel 4 and the like. The operation panel 4 then transmits information corresponding to the user input operations to the control unit 10. Instead of a separate operation panel 4, a touch panel may be integrated with the monitor 3, which may then display various user-selectable buttons and the like during operations of the POS terminal 1.

The scanner 5 is as described above. The speaker 6 can be used to emit a notification sound to perform a notification of a user or the like. The speaker 6 is an example of a notification unit in this context.

The RFID reader 7 causes the antenna 8 to radiate radio waves (e.g., emit tag interrogation signals and the like). The RFID reader 7 acquires tag information from a RFID tag that provides a response signal received by the antenna 8. The RFID reader 7 outputs the received tag information (or information corresponding thereto) to the control unit 10 via the input/output controller 13.

(Functional Aspects of POS Terminal)

Figure 3:
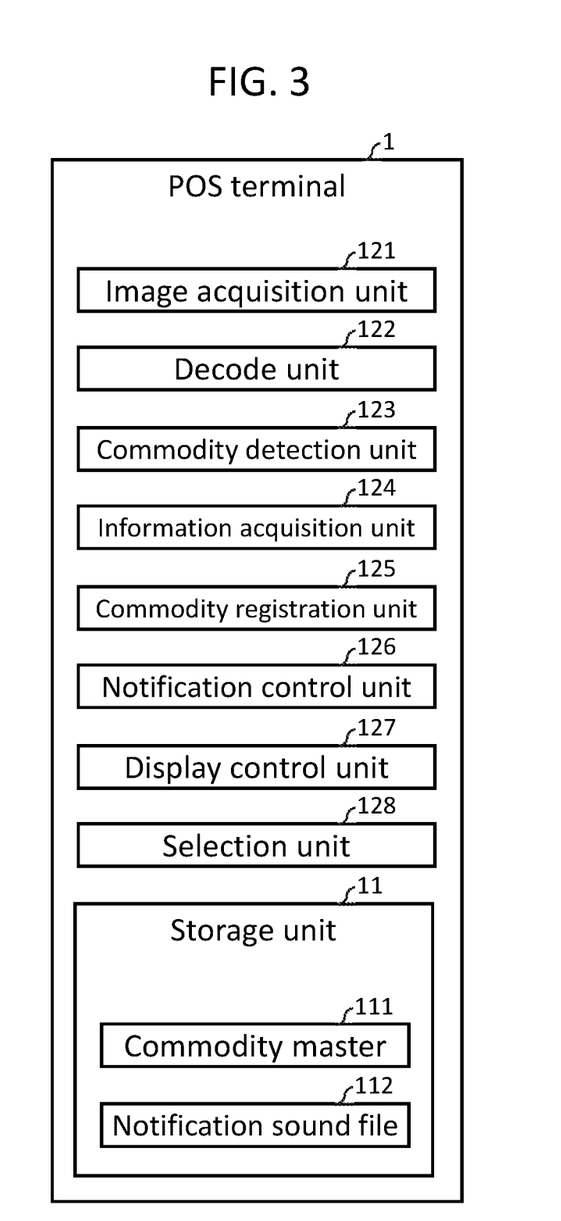
FIG. 3 is a block diagram depicting certain functional aspects of a POS terminal according to an embodiment.

Next, certain functional aspects of the POS terminal 1 will be described. FIG. 3 is a block diagram illustrating an example of a functional aspects of the POS terminal 1 according to the embodiment.

The POS terminal 1 includes, as functional units, components, or modules, an image acquisition unit 121, a decoding unit 122, a commodity detection unit 123, an information acquisition unit 124, a commodity registration unit 125, a notification control unit 126, a display control unit 127, and a selection unit 128.

A part or all of these functional units may be implemented by a software algorithm executed by of a processor (e.g., CPU 101) based on one or more various programs (for example, a control program) stored in, for example, ROM 102 and/or storage unit 11. A part or all of these described functional units may be implemented as a hardware circuit rather than in software. That is, one or more functional units may correspond to a dedicated hardware circuit, an electronic component, or the like.

The image acquisition unit 121 acquires an image that tis captured by the scanner 5. Specifically, when a transaction start is instructed by a user from the operation panel 4, the image acquisition unit 121 begins acquiring, via the input/output controller 13, image data (images) captured by the scanner 5.

When the end of the transaction is instructed via the operation panel 4 or otherwise, the image acquisition unit 121 stops acquiring the image data from the scanner 5.

The decoding unit 122 extracts information from an image region corresponding to a code symbol (e.g., a barcode, a two-dimensional code, or the like) in the image data acquired by the image acquisition unit 121. The decoding unit 122 thus executes a process for decoding code symbol to provide, for example, a commodity code encoded in a barcode or the like.

The commodity detection unit 123 detects that a commodity is in the scanner reading area, which is the area where the optical reading unit can read a code symbol on the commodity.

In the present embodiment, the commodity detection unit 123 detects whether a commodity is in the scanner commodity reading area based on an image acquired by the image acquisition unit 121. When a commodity is determined to be present in the image acquired by the image acquisition unit 121, it is determined that a commodity is in the scanner reading area.

In the present embodiment, the commodity detection unit 123 detects that a commodity is in the scanner reading area based on the image acquired by the image acquisition unit 121. However, in other examples, the commodity detection unit 123 may detect that a commodity is in the scanner reading area based on a detection result from an infrared sensor or other sensor separately provided in the main body 2.

The information acquisition unit 124 acquires commodity information based on a commodity code or the like provided by the decoding unit 112 after the reading of a code symbol by the scanner 5. The information acquisition unit 124 acquires a commodity code either from the decoded information from the decoding unit 122 or as read or otherwise provided by the RFID reader 7 reading an RFID tag of the commodity. Specifically, if the decoding unit 122 has succeeded in its decoding process and the RFID reader 7 has not read an RFID tag, the information acquisition unit 124 acquires decoded information from the decoding unit 122, then acquires the commodity information to the decoded information.

On the other hand, if the RFID reader 7 has succeeded in reading information from an RFID tag, the decoding unit 122 acquires the information read from the RFID tag if the commodity detection unit 123 also detects that a commodity is present in the scanner reading area even when the code symbol decoding process has already succeeded. That is, the commodity code read from the RFID tag (by the RFID reader 7) is used with priority over the code symbol information decoded by the decoding unit 122.

The commodity registration unit 125 performs a commodity registration process. In the present embodiment, the commodity registration unit 125 checks the commodity master 111 to determine whether commodity information corresponding to the commodity code information that has been acquired by the information acquisition unit 124 exists in the commodity master 111. The commodity registration unit 125 performs a commodity registration process if the commodity information corresponding to the acquired commodity code is in the commodity master 111. The commodity registration unit 125 is an example of a registration unit.

When the optical reading unit (e.g., scanner 5) reads a code symbol attached to a commodity, the notification control unit 126 controls the notification unit to generate a notification sound indicating a code symbol has been read by the optical reading unit.

When the wireless tag reading unit reads a wireless tag attached to a commodity and the commodity detection unit 123 also detects that the commodity is present in the scanner reading area, the notification control unit 126 also controls the notification unit to generate a notification sound.

In the present embodiment, the notification control unit 126 performs control such that the speaker 6 emits a successful registration notification sound based on the information encoded in the barcode, the two dimensional code, or the like only after the information acquisition unit 124 acquires the commodity information associated with the decoded information (for example, a commodity code provided by the decoding unit 122) and the commodity registration process has been successfully performed by the commodity registration unit 125.

In addition, in the present embodiment, when the commodity detection unit 123 detects that a commodity is in the scanner reading area and a RFID tag is read, the information acquisition unit 124 acquires commodity information according to the information (e.g., a commodity code) read from the RFID tag, and the commodity registration process can thus be successfully performed by the commodity registration unit 125, and the notification control unit 126 thus can control the speaker 6 to sound a notification sound for notifying that the commodity registration process has been successful for the information stored in the RFID tag.

In addition, if the commodity information that would otherwise be acquired by the information acquisition unit 124 does not exist in the commodity master 111, and the commodity registration unit 125 thus fails in the commodity registration process, the notification control unit 126 causes the speaker 6 to emit an error notification sound.

In the present embodiment, the successful registration notification sound indicating that the commodity registration process has succeeded based on the information encoded in a barcode, a two dimensional code, or the like, and the successful registration notification sound for notifying that the commodity registration process has succeeded based on the information stored in a RFID tag, and the error notification sound emitted when the commodity registration process has failed can each be different, distinguishable sounds.

When the commodity registration unit 125 performs the commodity registration process based on the information from an optically scanned code symbol, the display control unit 127 controls the display unit to display that the commodity registration process has been performed based on the information from the scanned code symbol. Similarly, when the commodity registration unit 125 performs the commodity registration process based on the information from a wireless tag reading, the display control unit controls the display unit to display that the commodity registration process has been performed based on the information from a wireless tag.

The display control unit 127 performs control to cause the monitor 3 to display an indication that the commodity registration process has failed if registration cannot be performed based on information read from a RFID tag or decoded by the decode unit 122.

The display control unit 127 performs control to cause the monitor 3 to indicate that the commodity registration process has been performed based on the information stored in the RFID tag when the information acquisition unit 124 acquires the information read from the RFID tag and the commodity registration process has been successfully performed by the commodity registration unit 125.

The selection unit 128 selects the notification sound.

In the present embodiment, the selection unit 128 selects, from the notification sounds stored in the notification sound file 112. The sound file 112 includes a notification sound for notifying that the commodity registration process has succeeded based on the information held in the barcode, the two-dimensional code, or the like, a notification sound for notifying that the commodity registration process has succeeded based on the information held in the RFID tag, or an error sound in a case where the commodity registration process has failed. Other sounds may be stored in sound 112 as well.

Next, certain information stored in the storage unit 11 of the POS terminal 1 will be described. The storage unit 11 stores the commodity master 111 and the notification sound file 112.

The commodity master 111 is a file that stores commodity information of each commodity sold in the store. In the present embodiment, the commodity information includes a commodity code in association with a commodity name, a price, and the like for a particular commodity. In addition, since the commodities handled in the store may change each day, the commodity master 111 can be updated by information transmitted from a server device or the like connected to the POS terminal 1. In some examples, the commodity master 11 may be stored in a storage unit such as a server device rather than locally in the storage unit 11 of the POS terminal 1.

The notification sound file 112 is a file storing notification sounds to be emitted from the speaker 6.

As described above, the notification sounds in the present embodiment include a notification sound indicating that the commodity registration process has succeeded based on the information held in a barcode, a two-dimensional code, or the like; a notification sound indicating that the commodity registration process has succeeded based on the information stored in the RFID tag; and an error sound indicating when the commodity registration process has failed. In some examples, the notification sound file 112 may be stored in a storage unit of a server device or the like rather than locally.

(Processing of POS Terminal)

Figure 4:
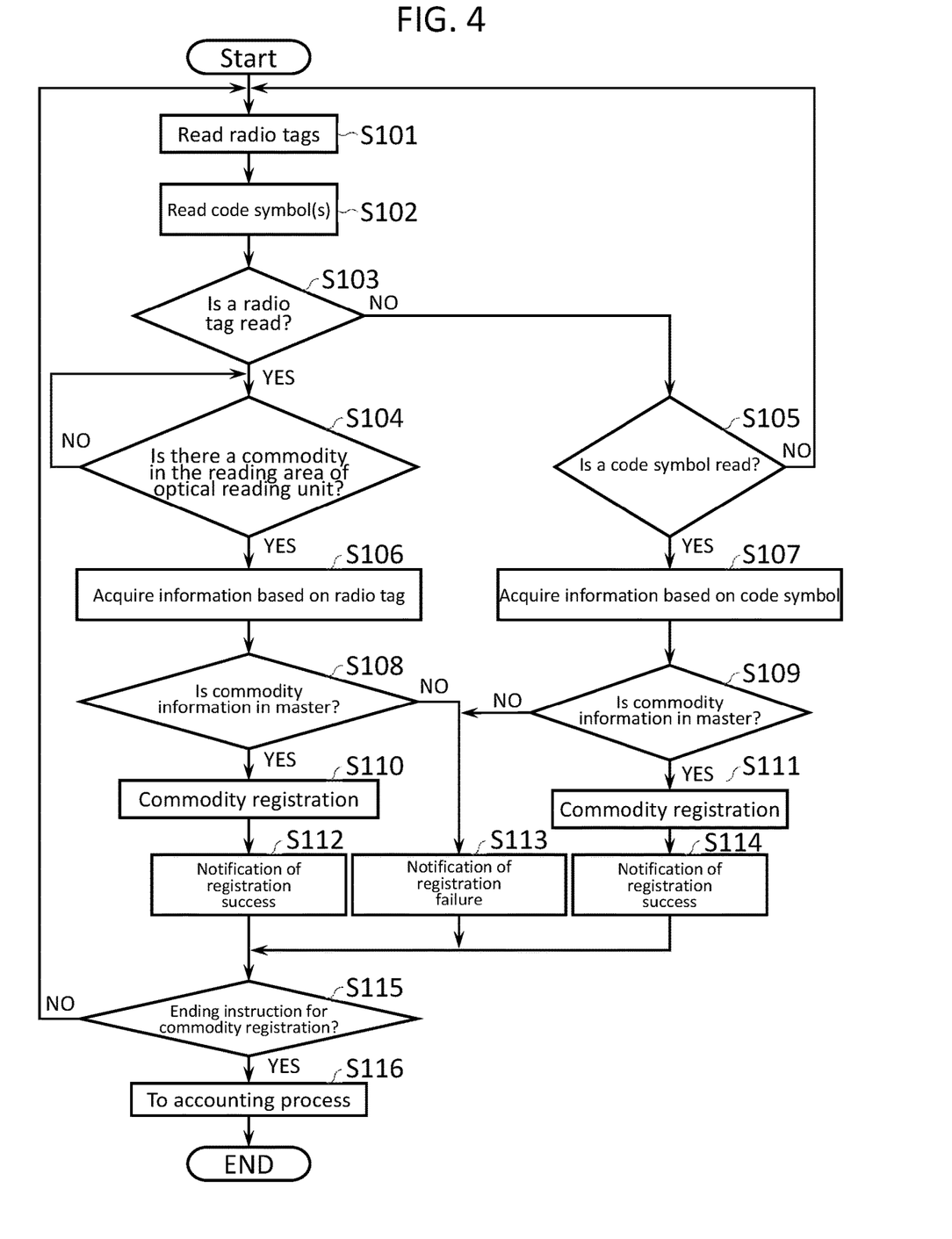
FIG. 4 is a flowchart of process of a POS terminal according to an embodiment.

Next, processing of the POS terminal 1 according to an embodiment will be described. FIG. 4 is a flowchart illustrating an example of processing of a POS terminal 1.

In response to a transaction start instruction from a user, the RFID reader 7 causes the antenna 8 to emit radio waves for reading RFID tags (Step S101).

At the same time, the image acquisition unit 121 also starts acquiring images being captured by the scanner 5 and attempts to read a barcode, a two-dimensional code, or the like in an acquired image (Step S102).

The information acquisition unit 124 checks whether the RFID reader 7 reads an RFID tag (Step S103). In a case where the RFID reader 7 reads information stored in the RFID tag (Step S103; Yes), the information acquisition unit 124 next confirms whether or not the commodity detection unit 123 also detects that a commodity is in the reading area of the scanner 5 using an image acquired by the image acquisition unit 121 (Step S104).

If a commodity is not in the reading area of the scanner 5 (Step S104 No), Step S104 is repeated until the commodity detection unit 123 detects a commodity is in the reading area of the scanner 5.

When a commodity is in the reading area of the scanner 5 (Step S104; Yes), the information acquisition unit 124 acquires the commodity code information stored in the RFID tag as read by the RFID reader 7 (Step S106). The commodity registration unit 125 utilizes the commodity code information acquired by the information acquisition unit 124 to check whether or not the commodity code information acquired by the information acquisition unit 124 matches a commodity code in the commodity master 111 (Step S108).

In a case where the acquired commodity code is not in the commodity master 111 (Step S108; No), the notification control unit 126 causes the speaker 6 to sound a notification sound for indicating that the commodity registration process has failed (Step S113).

The control unit 10 then checks whether an instruction to end the commodity registration process has been received (Step S115). When the instruction to end the commodity registration process has not been received (Step S115; No), Steps S101 to Step S115 can be repeated until the instruction to end the commodity registration process is received.

When the instruction to end the commodity registration process has been received (Step S115; Yes), the display control unit 127 performs control to cause the monitor 3 to display that a checkout process (also referred to as an accounting process or a transaction settlement process) has started (Step S116), and then ends the present commodity registration processing.

When the matching commodity information is in the commodity master 111 in Step S108 (Step S108; Yes), the commodity registration unit 125 performs the commodity registration process based on the information stored in the RFID tag as read by the RFID reader 7 (Step S110).

The notification control unit 126 performs control to cause the speaker 6 to emit a notification sound indicating that the commodity registration process has been successful using information stored in a RFID tag (Step S112). In addition, the display control unit 127 also controls the monitor 3 to display that the commodity registration process has been performed based on the information stored in a RFID tag.

Thereafter, the processes of Step S115 to Step S116 are performed, and the present process ends.

On the other hand, when the RFID reader 7 has not read information stored in a RFID tag in Step S103 (Step S103; No), the information acquisition unit 124 checks whether or not the decoding unit 122 has succeeded in the decoding process (Step S105). When the decoding process is not successful (Step S105; No), the process returns to Step S101 to repeat processing.

When the decoding process is successful (Step S105; Yes), the information acquisition unit 124 then attempts to acquire the commodity information associated with the barcode or a two-dimensional code that was read by the scanner 5 (Step S107). The commodity registration unit 125 checks whether or not the commodity information associated with the barcode or two-dimensional code is in the commodity master 111 (Step S109).

When the corresponding commodity information is not in the commodity master 111 (Step S109; No), the notification control unit 126 controls the speaker 6 to emit a notification sound for notifying that the commodity registration process of the particular item has failed (Step S113). Thereafter, the processes of Step S115 to Step S116 are performed, and the present process ends.

On the other hand, when the commodity information corresponding to the barcode or the like read by the optical scanning unit is in the commodity master 111 in Step S109 (Step S109; Yes), the commodity registration unit 125 performs the commodity registration process based on the commodity information associated with the barcode or the like (Step S111).

The notification control unit 126 performs control to cause the speaker 6 to emit a notification sound indicating that the commodity registration process has been successful using information acquired from a barcode or two-dimensional code or the like as read by the scanner 5 (Step S114). In addition, the display control unit 127 also performs control to cause the monitor 3 to display information indicating that the commodity registration process has been performed, based on the barcode or the like read by the scanner 5.

Thereafter, the processes of Step S115 to Step S116 are performed, and the present process ends.

(Effects of POS Terminal)

Next, certain possibly advantageous effects of a POS terminal 1 according to an embodiment will be described.

The POS terminal 1 according to the present embodiment includes a commodity detection unit 123 that detects when a commodity is within a commodity reading area in which the scanner 5 can read a barcode, a two-dimensional code, or the like. The POS terminal 1 also incorporates a notification control unit 126 that controls the speaker 6 to emit a notification sound when the commodity detection unit 123 detects that a commodity is in the commodity reading area when the RFID reader 7 reads an RFID tag attached to the commodity.

When the RFID reader 7 reads a commodity to which an RFID tag is attached, the notification control unit 126 performs control to cause the speaker 6 to sound a notification sound to perform notification only when the commodity enters the commodity reading area in which the scanner 5 can read a barcode, a two-dimensional code, or the like.

Therefore, even when the RFID reader 7 reads a commodity to which only an RFID tag is attached (that is no barcode or the like is on the commodity), the registration notification sound will not be generated until the commodity detection unit 123 detects that the commodity has been placed (or held) in the commodity reading area. Therefore, the user can perform the commodity registration process with substantially the same operating feel as when the scanner 5 is utilized to read a commodity with a barcode, the two-dimensional code, or the like is attached.

In addition, the POS terminal 1 according to the present embodiment includes a commodity registration unit 125 that registers commodity information and a monitor 3 that displays information. The commodity registration unit 125 is able to perform a commodity registration process based on information acquired from a barcode or a two-dimensional code attached to a commodity and read by the scanner 5 and also information acquired from an RFID tag attached to a commodity and read by the RFID reader 7.

The monitor 3 displays information indicating whether the commodity registration process has been performed based on the information read by the scanner 5 or based on the information read by the RFID reader 7.

Accordingly, when the commodity registration process is performed on a commodity having both a barcode label (or the like) and an RFID tag, the user can recognize which information was used for the registration.

In addition, the POS terminal 1 according to the present embodiment includes a selection unit 128 that selects the notification sound to be emitted to the user. Such a selection can be based on user preference or the like.

For example, the selection unit 128 can respectively select, based on the user's selection, a notification sound for notifying that the commodity registration process has succeeded based on information held in a barcode or a two-dimensional code, a notification sound for notifying that the commodity registration process has succeeded based on information stored in an RFID tag, or an error sound when the commodity registration process has failed.

When the selection unit 128 different sounds are used for the possible notifications, the user can distinguish been different situations such as "successful reading of only a barcode, a two-dimensional code, or the like", "successful reading of only an RFID tag", and "failure in the commodity registration process" based on the differences in the notification sounds.

In addition, since the selection unit 128 can select between various different notification sounds (that is, the notification sound file 112 can be customized and/or the selection unit can be configured to select from amongst various possible choices provided in the notification sound file 112), the store in which the POS terminal 1 is located can select the notification sound(s) matching an intended atmosphere of the store or the like. Furthermore, if the selection unit 128 is configured to be able to select the notification sound based on the selection by a customer, for example, it is possible to allow a child to enjoy the time during the commodity registration process by selecting a singing voice of an animal or character preferred by the child as the notification sound.

The POS terminal 1 includes a scanner 5, an RFID reader 7, and an antenna 8 proximate to the reading window 51. Since generally the user holds each commodity in front of the reading window 51, the distance between the antenna 8 and the RFID tag on a commodity is reduced by this configuration, and an effect of increasing the reading success rate of the RFID tags can be expected.

For example, when an RFID tag is attached to a metal commodity or the like, a reflected wave from a metal surface sometimes interferes with a response wave from the RFID tag, and thus it can be difficult for the RFID reader 7 to read the RFID tag on such items in some instances. However, if the RFID tag will be brought close to the antenna 8 during the registration processing, is then, generally, the possibility of successful RFID tag reading increases with reduced distance.

In some examples, a program executed by the POS terminal 1 can be provided by being incorporated in a non-transitory, computer readable storage medium (such as ROM 102 or the storage unit 11) included in the POS terminal 1 in advance. Likewise, the program executed by the POS terminal 1 may be stored in a computer connected to a network such as the Internet and provided to the POS terminal 1 by being downloaded via the network.

Similarly, such a program can be provided by being transmitted, distributed, downloaded, and/or accessed via a LAN, the Internet, or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A commodity registration device, comprising:
   an optical reading unit having a reading range and configured to acquire an image of a commodity in the reading range;
   a wireless tag reading unit configured to read a commodity code from a wireless tag of the commodity in the reading range of the optical reading unit; and
   a processor configured to:
      detect whether the commodity is in the reading range of the optical reading unit, and
      cause a notification unit to indicate the commodity has been registered by the wireless tag reading unit only when both the wireless tag reading unit successfully reads the commodity code from the wireless tag and the commodity is presently detected as being in the reading range of the optical reading unit.

2. The commodity registration device according to claim 1, wherein the processor is further configured to:
   acquire commodity information from a commodity master list based on a decoding of a code symbol in the image acquired by the optical reading unit, and
   acquire commodity information from the commodity master list based on the commodity code read from the wireless tag by the wireless tag reading unit.

3. The commodity registration device according to claim 2, further comprising:
   a storage unit storing the commodity master list.

4. The commodity registration device according to claim 2, wherein the processor is further configured to:
   register the commodity in a sales transaction according to the commodity information acquired from the commodity master list.

5. The commodity registration device according to claim 1, further comprising:
   a display screen, wherein
   the processor is further configured to:
   cause the display screen to indicate the commodity has been registered by the wireless tag reading unit only if both the wireless tag reading unit successfully reads the commodity code from the wireless tag and the commodity is detected as being in the reading range of the optical reading unit at the same time.

6. The commodity registration device according to claim 5, wherein the notification unit is a speaker configured to emit sound.

7. The commodity registration device according to claim 1, wherein the notification unit is a speaker configure to emit sound.

8. The commodity registration device according to claim 1, wherein the processor is further configured to cause the notification unit to indicate the commodity has been successfully registered by the optical reading unit but only if commodity information is obtained based on the image acquired by optical reading unit and the wireless tag reading unit does not read the commodity code from the wireless tag.

9. The commodity registration device according to claim 8, wherein
   the notification unit is a speaker, and
   the processor is further configured to cause the notification unit to emit a first sound to indicate the wireless tag reading unit successfully reads the commodity code from the wireless tag and a second sound to indicate the commodity has been registered by the optical reading unit.

10. The commodity registration device according to claim 1, wherein the notification unit is a speaker configured to emit sound, and the processor is further configured to receive a user selection of a notification sound to be emitted by the speaker.

11. The commodity registration device according to claim 1, further comprising:

a main body configured to be mounted on a checkout counter and having a reading window, wherein the optical reading unit is inside the main body and positioned to read through the reading window, and an antenna of the wireless tag reading unit is inside the main body and adjacent to the reading window.

12. A point-of-sale terminal, comprising:

a main body configured to be mounted on a checkout counter and having a reading window;

an optical reading unit inside the main body and configured to acquire, through the reading window, an image of a commodity within a reading range;

a wireless tag reading unit having an antenna inside the main body and adjacent to the reading window, the wireless tag reading unit configured to read a commodity code from a wireless tag of the commodity in the reading range of the optical reading unit;

a speaker configured to output sounds;

a display screen on an upper end of the main body; and a processor configured to:

detect whether the commodity is in the reading range of the optical reading unit, cause the speaker to emit a first sound to indicate the commodity has been registered only when the wireless tag reading unit successfully reads the commodity code from the wireless tag while the commodity is presently detected as being in the reading range of the optical reading unit, and cause the display screen to indicate the commodity has been registered if the wireless tag reading unit successfully reads the commodity code from the wireless tag while the commodity is presently detected as being in the reading range of the optical reading unit.

13. The point-of-sale terminal according to claim 12, wherein the processor is further configured to:

acquire commodity information from a commodity master list based on a decoding of a code symbol in the image acquired by the optical reading unit, and acquire commodity information from the commodity master list based on the commodity code read from the wireless tag by the wireless tag reading unit.

14. The point-of-sale terminal according to claim 13, further comprising:

a storage unit storing the commodity master list.

15. The point-of-sale terminal according to claim 13, wherein the processor is further configured to:

register the commodity in a sales transaction according to the commodity information acquired from the commodity master list.

16. The point-of-sale terminal according to claim 12, wherein the processor is further configured to cause the speaker to emit a second sound to indicate the commodity has been successfully registered by the optical reading unit but only if commodity information for the commodity is obtained based on the image acquired by optical reading unit and the wireless tag reading unit does not read the commodity code from the wireless tag.

17. The point-of-sale terminal according to claim 12, wherein the processor is further configured to receive a user selection of the first sound.

18. The point-of-sale terminal according to claim 12, wherein the processor is further configured to detect whether the commodity is in the reading range of the optical reading unit based on the image acquired by the optical reading unit.

19. A commodity registration device, comprising:

an optical reading unit having a reading range and configured to acquire product-specific information for a commodity in the reading range based on an image of the commodity acquired by the optical reading unit;

a wireless tag reading unit configured to read a commodity code from a wireless tag of the commodity in the reading range of the optical reading unit; and a processor configured to:

detect whether the commodity is in the reading range of the optical reading unit, and cause a notification unit to indicate the commodity has been registered by the wireless tag reading unit only when both the wireless tag reading unit successfully reads the commodity code from the wireless tag and the commodity is presently detected as being in the reading range of the optical reading unit.

* * * * *